US011405304B2

United States Patent
Singh et al.

(10) Patent No.: US 11,405,304 B2
(45) Date of Patent: Aug. 2, 2022

(54) ROUTE UPDATING USING A BFD PROTOCOL

(71) Applicant: HEWLETT PACKARD ENTERPRISE DEVELOPMENT LP, Houston, TX (US)

(72) Inventors: Jagdev Singh, Bangalore (IN); Abhisht Joshi, Bangalore (IN); Anil Raj, Bangalore (IN); Sarvotham Prasad R, Bangalore (IN); Kedar Laxman Kurtkoti, Bangalore (IN); Sinchana Kallesara Mruthyunjaya, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/021,508

(22) Filed: Sep. 15, 2020

(65) Prior Publication Data

US 2021/0099376 A1      Apr. 1, 2021

(30) Foreign Application Priority Data

Sep. 30, 2019     (IN) .............................. 201941039485

(51) Int. Cl.
| | |
|---|---|
| *H04L 41/0659* | (2022.01) |
| *H04L 69/324* | (2022.01) |
| *H04L 45/28* | (2022.01) |
| *H04L 45/02* | (2022.01) |
| *H04L 41/0668* | (2022.01) |
| *H04L 41/00* | (2022.01) |
| *H04L 49/55* | (2022.01) |

(52) U.S. Cl.
CPC ........ *H04L 45/025* (2013.01); *H04L 41/0659* (2013.01); *H04L 41/0668* (2013.01); *H04L 41/24* (2013.01); *H04L 45/28* (2013.01); *H04L 49/557* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 9,258,234 B1 * | 2/2016 | Addepalli | ............. H04L 67/142 |
| 2012/0075988 A1 * | 3/2012 | Lu | ....................... H04L 41/0654 |
| | | | 370/218 |
| 2013/0259056 A1 * | 10/2013 | Kotrabasappa | ......... H04L 45/50 |
| | | | 370/401 |

(Continued)

*Primary Examiner* — Mohamed Ibrahim
(74) *Attorney, Agent, or Firm* — Hewlett Packard Enterprise Patent Department

(57) ABSTRACT

Examples disclosed herein relate to a method comprising detecting, by a bi-directional forwarding detection (BFD) protocol, a link failure of a link associated with a network device on a network. The method may include notifying, by the BFD protocol, a routing protocol and a hardware plugin about the link failure and identifying, by the routing protocol, an updated route for the network that does not include the network device. The method may also include deleting, by the hardware plugin, any routes programmed into a forwarding information base (FIB) including the first network device upon receiving the notification from the BFD protocol and installing, by the hardware plugin, the updated route into the FIB to be used for forwarding network traffic on the network.

15 Claims, 4 Drawing Sheets

(56) References Cited

U.S. PATENT DOCUMENTS

2016/0080502 A1\* 3/2016 Yadav .................. G06F 16/285
709/227
2017/0346726 A1\* 11/2017 Menon ................... H04L 45/28

\* cited by examiner

ROUTE UPDATING USING A BFD PROTOCOL

BACKGROUND

Bidirectional Forwarding Detection (BFD) is a network protocol that may be used to detect faults between two network devices acting as forwarding engines, such as network switches connected by a link. It provides detection of faults even on physical media that doesn't support failure detection of any kind, such as Ethernet, virtual circuits and tunnels.

BRIEF DESCRIPTION OF THE DRAWINGS

Some implementations of the present disclosure are described with respect to the following figures.

Figure 1A:
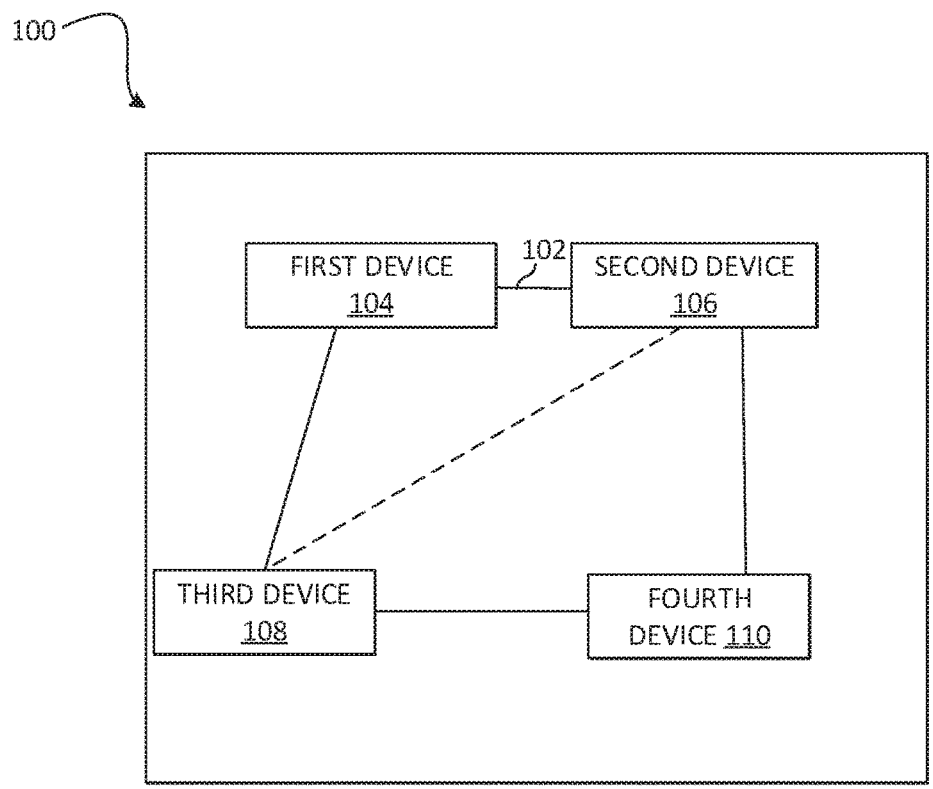
FIG. 1A is a block diagram of an example system for route updating using a BFD protocol.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

BFD may be used to detect rapid link failures thus supporting faster convergence. Although BFD may detect link failures within milliseconds, this information is first provided to the routing protocols to take action. Thereafter, the routing protocols in the local router may need to initiate the route recalculation and further notify the RTM (Routing table manager) to delete the routes so that it switches over to the secondary path programmed by FRR (Fast Re-Route) for forwarding. Accordingly, a time delay is added, even with an availability of alternate path in the network, thus negating many of the benefits in using BFD and FRR in achieving uninterrupted traffic switching. Aspects of present disclosure describe a technique that provides uninterrupted switching seamlessly salvaging the available alternate path.

Existing techniques may include notifying the routing protocol with a path down message soon as BFD detects a link failure it, which cascades to route recalculation, and deletes the route information corresponding to the link failure from the RTM, thus deleting the routes from the FIB (Forwarding information base) in the hardware.

One drawback with the existing implementation is the time taken between link failures detected by routing protocols and route deletion from the FIB initiated by routing protocols. For example, without BFD, a OSPF routing protocol may take 40 seconds and a BGP routing protocol may take 180 seconds by default to detect link failures between the network devices. Each router may then run a routing algorithm to recompute routes, update routing table based on this information, and installs the best route in the FIB which makes the process of route convergence very slow. With BFD enabled, the link failure detection time is reduced to sub-seconds but route deletion and switching to new path is still consumes considerable amount of time due to the time taken for recalculation.

A method for route updating using a BFD protocol may include detecting, by a bi-directional forwarding detection (BFD) protocol, a link failure of a link associated with a network device on a network. The method may also include notifying, by the BFD protocol, a routing protocol and a hardware plugin about the link failure, wherein the routing protocol and hardware plugin are notified simultaneously and identifying, by the routing protocol, an updated route for the network that does not include the network device. The method may also include deleting, by the hardware plugin, any routes programmed into a forwarding information base (FIB) including the first network device upon receiving the notification from the BFD protocol and installing, by the hardware plugin, the updated route into the FIB to be used for forwarding network traffic on the network.

FIG. 1 is a block diagram of an example system 100 where route updating using a BFD protocol may be used. The system 100 may include a network 102 having a plurality of devices including first device 104, second device 106, third device 108 and fourth device 110. Although only four devices are shown in system 100, this is for explanatory purposes only and any number of modules may be used in system 100.

Each of the devices 104-110 may be any number of network devices. For example, a network device may be a network switch. A switch may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth. A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Each of the devices 104-110 may be communicatively coupled to one or more of the other devices 104-110 in system 100 via network 108. Link 108 and the various connections between devices 104-110 may be a physical link, such as an Ethernet connection or other physical connection, a wireless connection, a virtual connection, etc.

Each of the devices 104-110 may communicate via a variety of routing protocols, such as RIP, BGP, EIGRP, IS-IS, VRRP and OSPF.

One or more the devices 104-110 may run a BFD protocol to provide rapid peer failure detection times independently of all media types, encapsulations, topologies, and routing protocols, such as RIP, BGP, EIGRP, IS-IS, VRRP and OSPF. By sending rapid failure detection notice to these routing protocols in the local router to initiate the routing table recalculation process, BFD contributes to greatly reduced overall network convergence time.

One or more the devices 104-110 may run a Fast Reroute (FRR) feature that allows a routing protocol to quickly switch to a backup path when a primary path fails. Without FRR, the routing protocol has to re-run routing algorithm to find a new path when the primary path fails. With FRR, the routing protocols pre-computes a backup path and installs the backup next hop path in the forwarding table. A backup path may be pre-installed in the FIB to reduce the time taken to switch over to the secondary path when the primary path fails.

Bidirectional Forwarding Detection (BFD) is a detection protocol that may be used to detect faults between two network devices acting as forwarding engines, such as network switches connected by a link. BFD may be used to provide fast forwarding path failure detection times for media types, encapsulations, topologies, and routing protocols. BFD can be used to detect forwarding path failures at a uniform rate, rather than the variable rates for different routing protocol hello mechanisms, making network profiling and planning easier and reconvergence time will be consistent and predictable. BFD may use control packets and echo packets to detect link failures.

As mentioned above, aspects of the present invention may enables a seamless transition to the secondary path, thus there is a significant improvement in route convergence time.

Specifically, aspects of the present invention describe herein include a technique where BFD notifies the routing protocol about a link failure. Following this, the routing protocol initiates it's routing table calculations and route deletion takes place. Deletion of the routes is triggered in the hardware plugin directly by BFD based on the neighbor it tracks and routes pointing to neighbor learnt from the protocol registered for failure detection with BFD. Now the ASIC installs the pre-programmed secondary routes into FIB to be selected for forwarding the traffic. Thus, providing uninterrupted network services with minimal impact on traffic. Simultaneously the notified routing protocol makes the adjacency to R4 peer down and initiates routing table recalculations to delete the routes learnt via R4 and update its routing table of any additional routes. This update is handled gracefully.

Figure 1B:
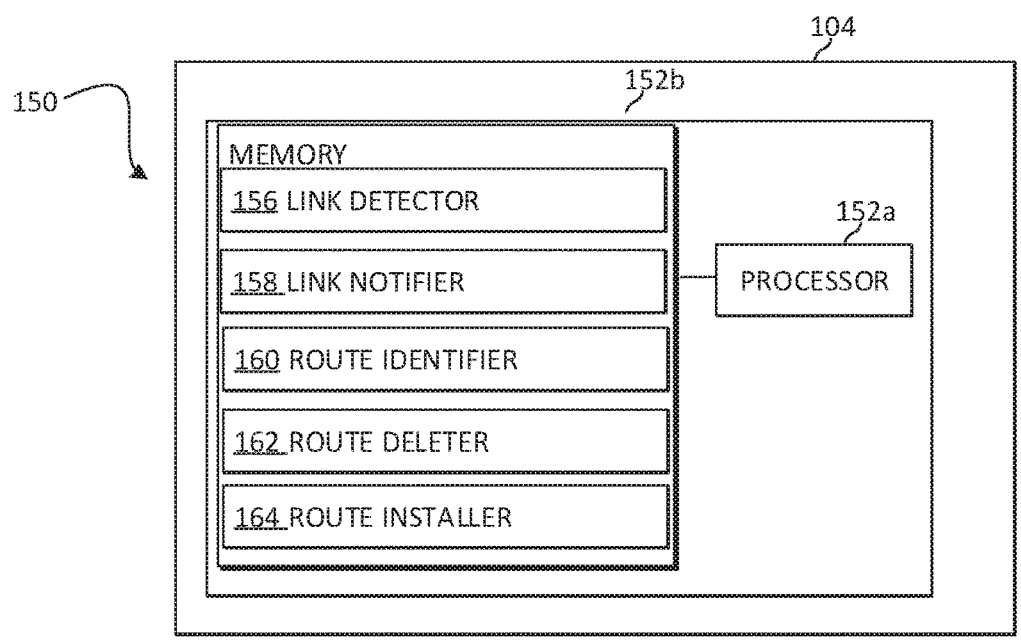
FIG. 1B is a block diagram of another example system for route updating using a BFD protocol.

Turning now to FIG. 1B, an example network device 150 is shown. The network device may be similar to one or more of the devices illustrated in FIG. 1A, such as the first device. Network device 150 may include a processor 152a and a machine-readable storage medium 152b that may be coupled to each other through a communication link (e.g., a bus). Processor 152a may include a single or multiple Central Processing Units (CPU) or another suitable hardware processor(s), such as a network ASIC. Machine-readable storage medium 152b may store machine readable instructions may executed by processor 152a. Machine-readable storage medium 152b may include any suitable combination of volatile and/or non-volatile memory, such as combinations of Random Access Memory (RAM), Read-Only Memory (ROM), flash memory, and/or other suitable memory.

Machine-readable storage medium 152b stores instructions to be executed by processor 152a including instructions for link detector 156, link notifier 158, route identifier 160, route deleter 162 and route installer 164.

Processor 152a may execute link detector 156 to detect a link failure of a link associated with a network device on a network. Processor 152a may execute link notifier 158 to notify a routing protocol and a hardware plugin about the link failure, wherein the routing protocol and hardware plugin are notified simultaneously. The hardware plugin may be an application specific integrated circuit (ASIC) plugin used to program the FIB in the ASIC.

Processor 152a may execute route identifier 160 to identify an updated route for the network that does not include the network device. Processor 152a may execute route identifier 160 to remove any routes in a routing table manager (RTM) that include the network device, upon receiving the notification from the BFD protocol. The updated route may be one of a plurality of updated routes determined before the link failure has been detected. The updated route may be determined using a fast reroute routing technique.

Processor 152a may execute route deleter 162 to delete any routes programmed into a forwarding information base (FIB) including the first network device upon receiving the notification from the BFD protocol. Any routes programmed into a FIB including the first network device may be deleted without accessing the RTM.

Processor 152a may execute route deleter 162 to delete, by the hardware plugin, any routes in the FIB including the first network device and any routes pointing to the first network device learnt from the routing protocol. The link failure may be a failure of a path to the network device. Processor 152a may execute route installer 164 to install the updated route into the FIB to be used for forwarding network traffic on the network.

Figure 2:
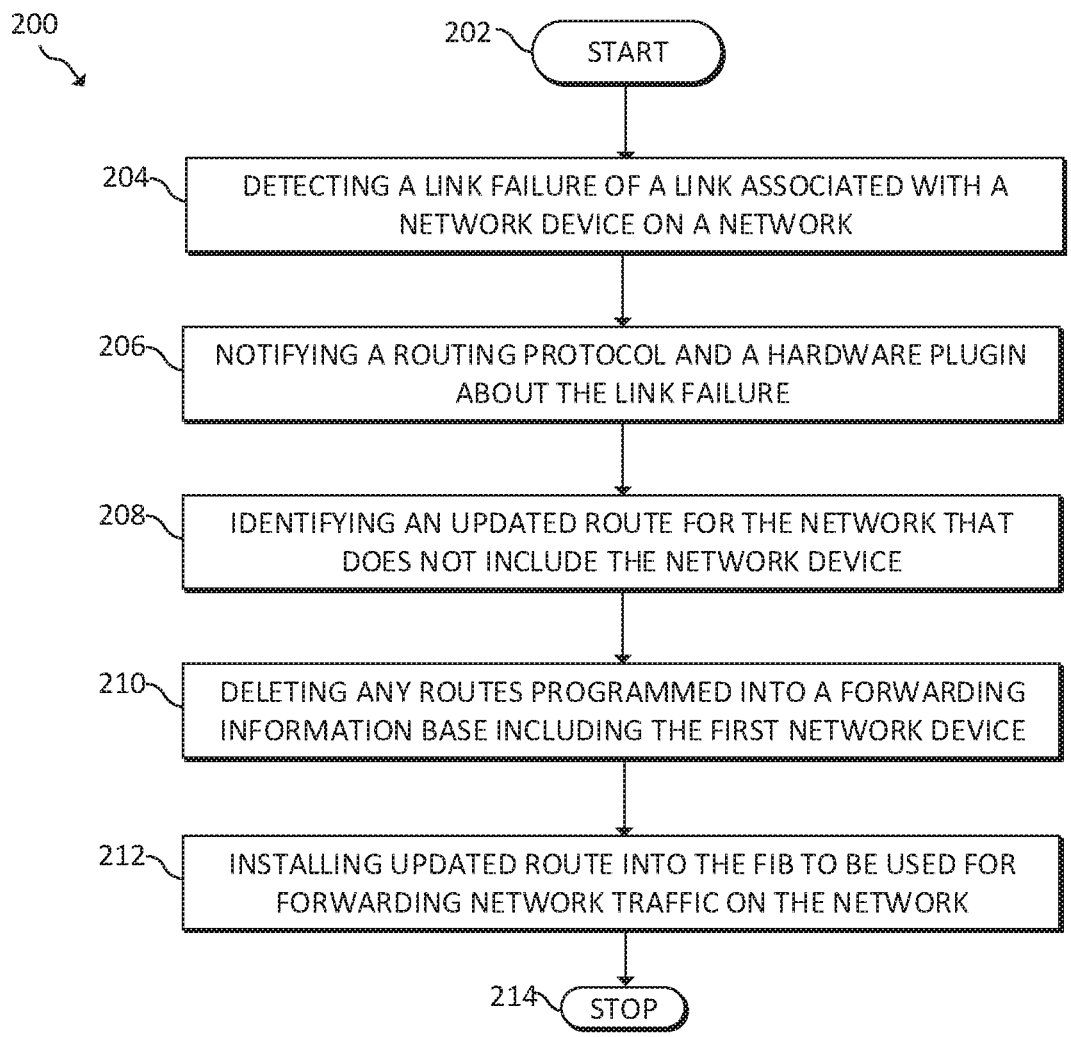
FIG. 2 is a flow diagram of an example method for route updating using a BFD protocol.

FIG. 2 is a flow diagram of a method 200 for route updating using a BFD protocol. The system where method 200 is performed may be similar to system 100 described above. Accordingly, parts of and/or the entire method may be performed by one or more of the devices belonging to system 100.

The method 200 may begin at block 202 and proceed to block 204, where the method may include detecting, by a bi-directional forwarding detection (BFD) protocol, a link failure of a link associated with a network device on a network. At block 206, the method may include notifying, by the BFD protocol, a routing protocol and a hardware plugin about the link failure, the routing protocol and hardware plugin may be notified simultaneously. The hardware plugin may be an application specific integrated circuit (ASIC) plugin used to program the FIB in the ASIC.

At block 208, the method may include identifying, by the routing protocol, an updated route for the network that does not include the network device. The updated route may be one of a plurality of updated routes determined before the link failure has been detected. The updated route may be determined using a fast reroute routing technique. In some aspects, the method may include removing, by the routing protocol, any routes in a routing table manager (RTM) that include the network device, upon receiving the notification from the BFD protocol.

At block 210, the method may include deleting, by the hardware plugin, any routes programmed into a forwarding information base (FIB) including the first network device upon receiving the notification from the BFD protocol. The routes programmed into the FIB including the first network device may be deleted without accessing the RTM. In some aspects, the link failure is a failure of a path to the network device and the method may also include deleting, by the hardware plugin, any routes in the FIB including the first network device and any routes pointing to the first network device learnt from the routing protocol.

At block 212, the method may include installing, by the hardware plugin, the updated route into the FIB to be used for forwarding network traffic on the network. The method may proceed to block 214, where the method may end.

Figure 3:
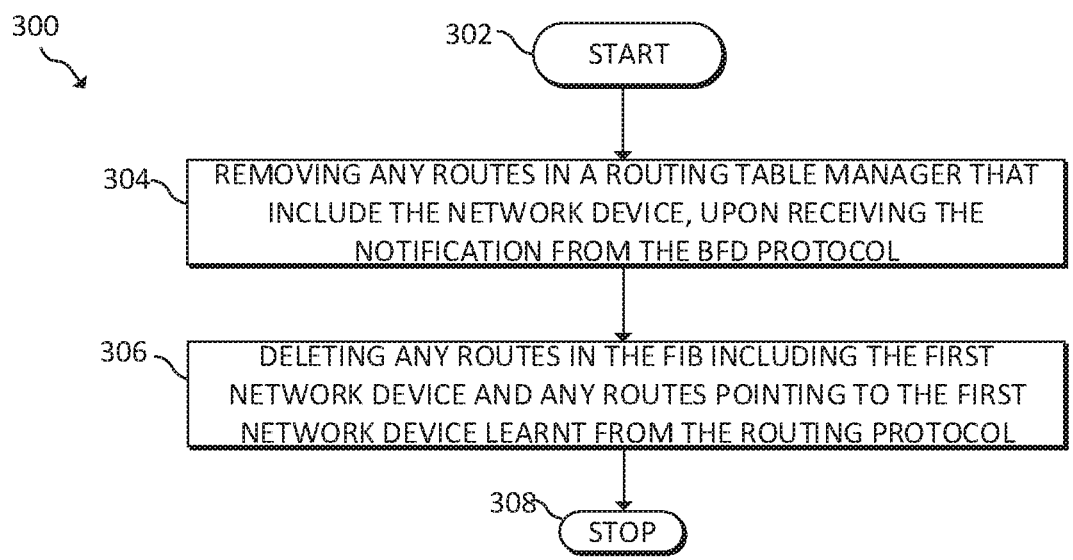
FIG. 3 is a flow diagram of another example method for route updating using a BFD protocol.

FIG. 3 is a flow diagram of another method 300 for route updating using a BFD protocol. The system where method 300 is performed may be similar to system 100 described above. Accordingly, parts of and/or the entire method may be performed by one or more of the devices belonging to system 100.

The method 300 may begin at block 302 and proceed to block 304, where the method may include removing, by the routing protocol, any routes in a routing table manager (RTM) that include the network device, upon receiving the notification from the BFD protocol. At block 306, the method may include deleting, by the hardware plugin, any routes in the FIB including the first network device and any routes pointing to the first network device learnt from the routing protocol. The method may proceed to block 308, where the method may end.

Figure 4:
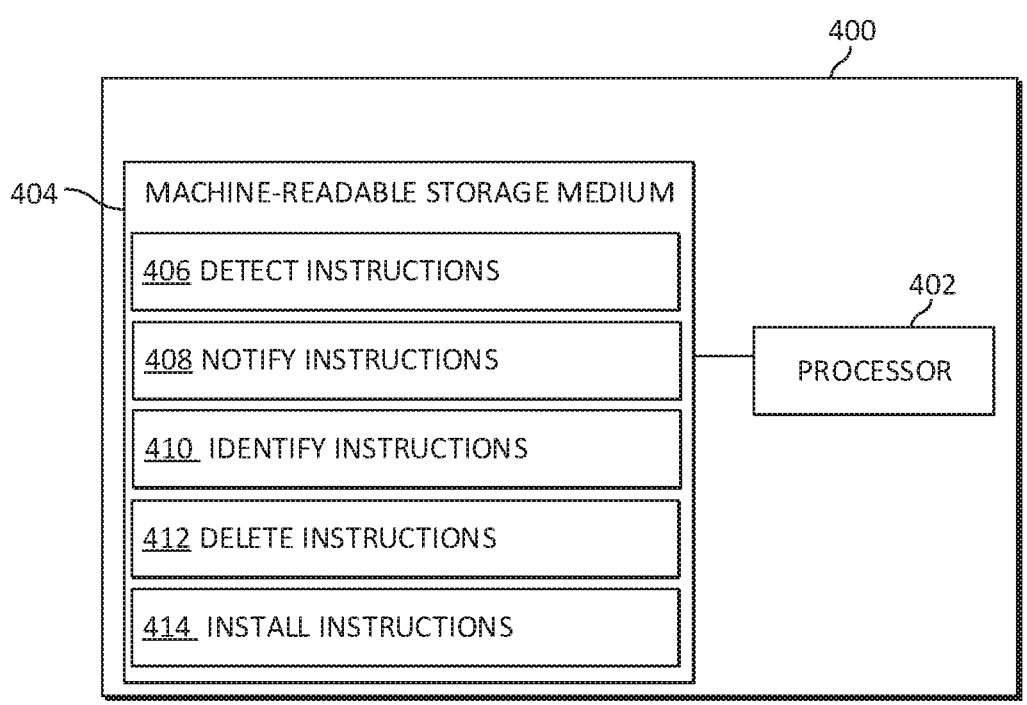
FIG. 4 is a flow diagram of another example method for route updating using a BFD protocol.

FIG. 4 is a block diagram of an example system 400 for route updating using a BFD protocol. In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408, 410, 412 and 414. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, detect instructions 406, when executed by a processor (e.g., 402), may cause system 400 to detect, by a bi-directional forwarding detection (BFD) protocol, a link failure of a link associated with a network device on a network.

Referring to FIG. 4, notify instructions 408, when executed by a processor (e.g., 402), may cause system 400 to notify, by the BFD protocol, a routing protocol and a hardware plugin about the link failure, the routing protocol and hardware plugin may be notified simultaneously. The hardware plugin may be an application specific integrated circuit (ASIC) plugin used to program the FIB in the ASIC Referring to FIG. 4, identify instructions 410, when executed by a processor (e.g., 402), may cause system 400 to identify, by the routing protocol, an updated route for the network that does not include the network device. The updated route may be one of a plurality of updated routes determined before the link failure has been detected. The updated route may be determined using a fast reroute routing technique. In some aspects, the method may include removing, by the routing protocol, any routes in a routing table manager (RTM) that include the network device, upon receiving the notification from the BFD protocol Referring to FIG. 4, delete instructions 412, when executed by a processor (e.g., 402), may cause system 400 to delete, by the hardware plugin, any routes programmed into a forwarding information base (FIB) including the first network device upon receiving the notification from the BFD protocol. The routes programmed into the FIB including the first network device may be deleted without accessing the RTM. In some aspects, the link failure is a failure of a path to the network device and the method may also include deleting, by the hardware plugin, any routes in the FIB including the first network device and any routes pointing to the first network device learnt from the routing protocol.

Referring to FIG. 4, install instructions 414, when executed by a processor (e.g., 402), may cause system 400 to install, by the hardware plugin, the updated route into the FIB to be used for forwarding network traffic on the network The foregoing disclosure describes a number of examples for route updating using a BFD protocol. The disclosed examples may include systems, devices, computer-readable storage media, and methods for route updating using a BFD protocol. For purposes of explanation, certain examples are described with reference to the components illustrated in FIGS. 1A-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   detecting, by a bi-directional forwarding detection (BFD) protocol, a link failure of a link associated with a network device in a network;
   notifying, by the BFD protocol, a routing protocol and a hardware plugin about the link failure, wherein the routing protocol and hardware plugin are notified simultaneously;
   removing, by the routing protocol, any route in a routing table manager (RTM) that includes the network device, based on the notification from the BFD protocol;
   identifying, by the routing protocol, an updated route for the network that does not include the network device;
   deleting, by the hardware plugin without accessing the RTM, any route stored in a forwarding information base (FIB) that includes the network device upon receiving the notification from the BFD protocol; and
   storing, by the hardware plugin, the updated route into the FIB to be used for forwarding network traffic in the network.

2. The method of claim 1 wherein the updated route is one of a plurality of updated routes determined before the link failure has been detected.

3. The method of claim 1, wherein the updated route is determined using a fast reroute routing technique.

4. The method of claim 1 wherein the hardware plugin is an application specific integrated circuit (ASIC) plugin used to program the FIB in the ASIC.

5. The method of claim 1 wherein the link failure is a failure of a path to the network device, the method comprising:
   deleting, by the hardware plugin, any routes in the FIB including the network device and any routes pointing to the network device learnt from the routing protocol.

6. A non-transitory computer-readable storage medium encoded with instructions, the instructions executable by a processor of a system to cause the system to:
   detect, by a bi-directional forwarding detection (BFD) protocol, a link failure of a link associated with a network device in a network;
   notify, by the BFD protocol, a routing protocol and a hardware plugin about the link failure, wherein the routing protocol and hardware plugin are notified simultaneously;
   remove, by the routing protocol, any route in a routing table manager (RTM) that includes the network device, based on the notification from the BFD protocol;
   identify, by the routing protocol, an updated route for the network that does not include the network device;
   delete, by the hardware plugin without accessing the RTM, any route stored in a forwarding information base (FIB) that includes the network device upon receiving the notification from the BFD protocol; and
   store, by the hardware plugin, the updated route in the FIB to be used for forwarding network traffic in the network.

7. The non-transitory computer-readable storage medium of claim 6 wherein the updated route is one of a plurality of updated routes determined before the link failure has been detected.

8. The non-transitory computer-readable storage medium of claim 7, wherein the hardware plugin is an application specific integrated circuit (ASIC) plugin used to program the FIB in the ASIC and wherein the instructions executable by the processor cause the system to:
   delete, by the hardware plugin, any routes in the FIB including the network device and any routes pointing to the network device learnt from the routing protocol.

9. The non-transitory computer-readable storage medium of claim 7, wherein the link failure is a failure of a path to the network device and wherein the instructions executable by the processor cause the system to:
   delete, by the hardware plugin, any routes in the FIB including the network device and any routes pointing to the network device learnt from the routing protocol.

10. The non-transitory computer-readable storage medium of claim 6 wherein the updated route is determined using a fast reroute routing technique.

11. A system comprising:
    a processor; and
    a storage device coupled to the processor and storing instructions, which when executed by the processor cause the processor to perform a method, the method comprising:
    detecting, by a bi-directional forwarding detection (BFD) protocol, a link failure of a link associated with a network device in a network;
    notifying, by the BFD protocol, a routing protocol and a hardware plugin about the link failure, wherein the routing protocol and hardware plugin are notified simultaneously;
    removing, by the routing protocol, any route in a routing table manager (RTM) that includes the network device, based on the notification from the BFD protocol;
    identifying, by the routing protocol, an updated route for the network that does not include the network device;
    deleting, by the hardware plugin without accessing the RTM, any route stored in a forwarding information base (FIB) that includes the network device upon receiving the notification from the BFD protocol; and
    storing, by the hardware plugin, the updated route into the FIB to be used for forwarding network traffic in the network.

12. The system of claim 11 wherein the updated route is one of a plurality of updated routes determined before the link failure has been detected.

13. The system of claim 11 wherein the updated route is determined using a fast reroute routing technique.

14. The system of claim 11 wherein the hardware plugin is an application specific integrated circuit (ASIC) plugin used to program the FIB in the ASIC.

15. The system of claim 11, the method further comprising:
    deleting, by the hardware plugin, any route in the FIB including the network device and any routes pointing to the network device learnt from the routing protocol, wherein the link failure is a failure of a path to the network device.

* * * * *